US011105756B2

(12) United States Patent
Xiang et al.

(10) Patent No.: US 11,105,756 B2
(45) Date of Patent: Aug. 31, 2021

(54) X-RAY DIFFRACTION AND X-RAY SPECTROSCOPY METHOD AND RELATED APPARATUS

(71) Applicant: Ningbo Galaxy Materials Technology Co., Ltd., Ningbo (CN)

(72) Inventors: Xiao-dong Xiang, Danville, CA (US); Hong Wang, Beijing (CN); Xiao-Ping Wang, Ningbo (CN)

(73) Assignee: NINGBO GALAXY MATERIALS TECHNOLOGY CO. LTD., Ningbo (CN)

( * ) Notice: Subject to any disclaimer, the term of this patent is extended or adjusted under 35 U.S.C. 154(b) by 0 days.

(21) Appl. No.: 16/430,307

(22) Filed: Jun. 3, 2019

(65) Prior Publication Data
US 2020/0158667 A1     May 21, 2020

Related U.S. Application Data

(63) Continuation-in-part of application No. PCT/US2017/064372, filed on Dec. 2, 2017.
(Continued)

(51) Int. Cl.
*G01N 23/20091*  (2018.01)
*G01N 23/2055*   (2018.01)
*G01N 23/087*    (2018.01)
*G01N 23/223*    (2006.01)

(52) U.S. Cl.
CPC ..... *G01N 23/20091* (2013.01); *G01N 23/087* (2013.01); *G01N 23/2055* (2013.01);
(Continued)

(58) Field of Classification Search
None
See application file for complete search history.

(56) References Cited

U.S. PATENT DOCUMENTS 5,491,738 A * 2/1996 Blake ................... G01N 23/207
378/49
7,206,375 B2    4/2007 Chen et al.
(Continued)

OTHER PUBLICATIONS

Drakopoulos et.al., "I12: the Joint Engineering, Environment and Processing (JEEP) beamline at Diamond Light Source", Journal of Synchrotron Radiation, vol. 22, Part 3, May 2015, pp. 828-838.
(Continued)

*Primary Examiner* — Thomas R Artman
(74) *Attorney, Agent, or Firm* — Chen Yoshimura LLP

(57) ABSTRACT

A method and apparatus for rapid measurement and analysis of structure and composition of poly-crystal materials by X-ray diffraction and X-ray spectroscopy, which uses a two-dimensional energy dispersive area detector having an array of pixels, and a white spectrum X-ray beam source. A related data processing method includes separating X-ray diffraction and spectroscopy signals in the energy dispersive X-ray spectrum detected by each pixel of the two-dimensional energy dispersive detector; correcting the detected X-ray diffraction signals by a correction function; summing the corrected X-ray diffraction signals and X-ray spectroscopy signals, respectively, over all pixels to obtain an enhanced diffraction spectrum and an enhanced spectroscopy spectrum; using the enhanced diffraction and spectroscopy spectrum respectively to determine the structure and composition of the sample. The summing step includes using Bragg's equation to convert the intensity-energy diffraction spectrum for each pixel into an intensity-lattice spacing spectrum before summing them.

19 Claims, 7 Drawing Sheets

Related U.S. Application Data

(60) Provisional application No. 62/429,358, filed on Dec. 2, 2016.

(52) U.S. Cl.
CPC ... G01N 23/223 (2013.01); *G01N 2223/0563* (2013.01); *G01N 2223/0566* (2013.01); *G01N 2223/071* (2013.01); *G01N 2223/076* (2013.01); *G01N 2223/3037* (2013.01); *G01N 2223/3307* (2013.01); *G01N 2223/501* (2013.01); *G01N 2223/606* (2013.01)

(56) References Cited

U.S. PATENT DOCUMENTS

| | | |
|---|---|---|
| 7,564,947 B2 | 7/2009 | Cernik |
| 7,796,726 B1 | 9/2010 | Gendreau et al. |
| 7,978,820 B2 | 7/2011 | Kharchenko et al. |
| 8,903,040 B2* | 12/2014 | Maeyama ............ G01N 23/223 378/46 |
| 2011/0007869 A1* | 1/2011 | Gendreau ............ G01N 23/20 378/46 |
| 2012/0288058 A1* | 11/2012 | Maeyama ............ G01N 23/223 378/46 |
| 2020/0158667 A1* | 5/2020 | Xiang ................ G01N 23/2055 |

OTHER PUBLICATIONS

International Search Report in the parent PCT application No. PCT/US2017/064372, dated Feb. 15, 2018.

IPRP in the parent PCT application No. PCT/US2017/064372, dated Jun. 4, 2019.

\* cited by examiner

X-RAY DIFFRACTION AND X-RAY SPECTROSCOPY METHOD AND RELATED APPARATUS

BACKGROUND OF THE INVENTION

Field of the Invention

The present invention generally relates to methods and apparatus of two-dimensional energy-dispersive X-ray detection for determining the structure and composition of poly-crystal materials by quick X-ray diffraction and X-ray spectroscopies, especially X-ray fluorescence spectroscopy.

Description of Related Art

X-ray diffraction is the most widely used phase identification and structure analysis method of poly-crystalline materials. The diffraction peaks appear at conditions that satisfy the Bragg equation $2d\sin\theta = n\lambda$ (where d is the distance between lattice planes, related to the lattice parameters of the material; $2\theta$ is the diffraction angle; $\lambda$ is the X-ray wavelength; and n is an arbitrary integer).

The most common X-ray diffraction method is angle resolved X-ray diffraction, by using a single-wavelength X-ray beam to irradiate a poly-crystal sample, collecting the diffraction spectrum by rotating a single point scintillator along the goniometer, and obtaining the diffraction intensity as function of the diffraction angle $\theta$. The distances between lattice planes are calculated from the angles of the diffraction peaks and the incident X-ray wavelength. And then the crystal structure of material is obtained from the distances between the lattice planes. Angle resolved X-ray diffraction with a normal area detector can collect signals in a wide diffraction angle simultaneously, which avoids mechanical movement and saves measurement times.

Another X-ray diffraction method for poly-crystal sample is energy dispersive X-ray diffraction, by using a continuous wavelength X-ray beam to irradiate a sample, collecting the diffraction spectrum by an energy dispersive detector locating at a fixed diffraction angle $2\theta_0$. The diffraction peaks appear at conditions that satisfy the Bragg equation $2d\sin\theta_0 = n\lambda = n \cdot 12.398/E$ (where E is the energy of X-ray in unit of keV and the unit of d is angstrom). In this case, the diffraction spectrum is the diffraction intensity as function of the detected energy of X-ray E. The distances between lattice planes are calculated from the diffraction angle of the detector and the energy of the X-ray. And then the crystal structure of material is obtained in the same manner as described above.

Energy dispersive X-ray diffraction is a static X-ray diffraction technique which does not require mechanical movement and can also save measurement time. The diffraction intensity may be improved by accumulating energy dispersive spectrums measured by multiple detectors locating on the same Debye ring (see FIG. 1, which shows multiple detectors located at the same diffraction angle $2\theta$, i.e. on the same Debye ring, but different azimuthal angles $\varphi$). For example, M. Drakopoulos placed 23 energy dispersive detectors at the same diffraction angle, covering half of one Debye ring (see M. Drakopoulos et.al., J. Synchrotron Rad. (2015). 22, 828-838). But the space of one Debye ring is small, which limits the number of available detectors and still wastes most of the diffraction signal as well.

X-ray fluorescence spectroscopy (XRF) is a useful tool for determining the compositions of materials, without damaging samples, based on different fluorescence peaks from different elements. The signal of current XRF technologies with single or multiple energy dispersive detectors is relatively weak, which is not suitable for rapid measurement. Also, the current XRF technologies use only a very small part of the isotropic X-ray fluorescence signals.

SUMMARY

A purpose of embodiments of the current invention is to provide a new method and an apparatus of rapidly X-ray diffraction and X-ray spectroscopy for poly-crystalline samples.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a system for rapidly measuring and analyzing structure and composition of a material sample, which includes: an X-ray source configured to emit a white X-ray beam; a sample stage for holding a sample and placing the sample on an irradiation path of the X-ray source; a two-dimensional energy dispersive detector disposed in a predetermined spatial relationship with the sample stage to receive X-ray signals from the sample, the two-dimensional energy dispersive detector including an array of energy dispersive pixels, each pixel being an independent detector unit configured to detect an energy dispersive X-ray spectrum; and a controller connected to the X-ray source, the sample stage, and the two-dimensional energy dispersive detector, to control them and to perform data analysis.

In some embodiments, the controller includes a computer usable non-transitory medium having a computer readable program code embedded therein for controlling the controller, the computer readable program code configured to cause the controller to execute a process for analyzing data detected by the two-dimensional energy dispersive detector, the process including: separating X-ray diffraction signals and X-ray spectroscopy signals in the energy dispersive X-ray spectrum detected by each pixel; correcting the detected X-ray diffraction signals by a correction function which includes at least a quantum efficiency of the detector, a transmission of air and the sample, an X-ray spectrum of the light source; summing the corrected X-ray diffraction signals and X-ray spectroscopy signals, respectively, over all pixels of the two-dimensional energy dispersive detector, to obtain an enhanced diffraction spectrum and an enhanced spectroscopy spectrum; using the enhanced diffraction spectrum to determine the structure of the sample; and using the enhanced spectroscopy spectrum to determine the composition of the sample.

In some embodiment, wherein separating step includes: obtaining a detected X-ray spectrum $\hat{I}(E, \theta_{ij})$ of each pixel from the data detected by the two-dimensional energy dispersive detector; from the X-ray spectrums of all pixels, calculating a spectrum component that is common to all pixels as a spectroscopy spectrum $F(E, \theta_{ij})$; and subtracting the spectroscopy spectrum $F(E, \theta_{ij})$ from the X-ray spectrum $\hat{I}(E, \theta_{ij})$ of each pixel to calculate a diffraction spectrum $I(E, \theta_{ij})$ for each pixel.

In another aspect, the present invention provides a method for rapidly measuring and analyzing structure and composition of a poly-crystalline sample, including: holding the poly-crystalline sample on a sample stage; illuminating the poly-crystalline sample with a white X-ray beam generated by an X-ray source; detecting X-ray diffraction and X-ray spectroscopy signals from the sample using a two-dimensional energy dispersive detector, the two-dimensional energy dispersive detector containing an array of energy dispersive pixels, each pixel being an independent detector unit configured to detect an energy dispersive X-ray spectrum; and analyzing data detected by the two-dimensional energy dispersive detector using a computer, including: separating X-ray diffraction signals and X-ray spectroscopy signals in the energy dispersive X-ray spectrum detected by each pixel; correcting the detected X-ray diffraction signals by a correction function which includes at least a quantum efficiency of the detector, a transmission of air and the sample, an X-ray spectrum of the light source; summing the corrected X-ray diffraction signals and X-ray spectroscopy signals, respectively, over all pixels of the two-dimensional energy dispersive detector, to obtain an enhanced diffraction spectrum and an enhanced spectroscopy spectrum; using the enhanced diffraction spectrum to determine the structure of the sample; and using the enhanced spectroscopy spectrum to determine the composition of the sample.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF EMBODIMENTS OF THE INVENTION

Figure 1:
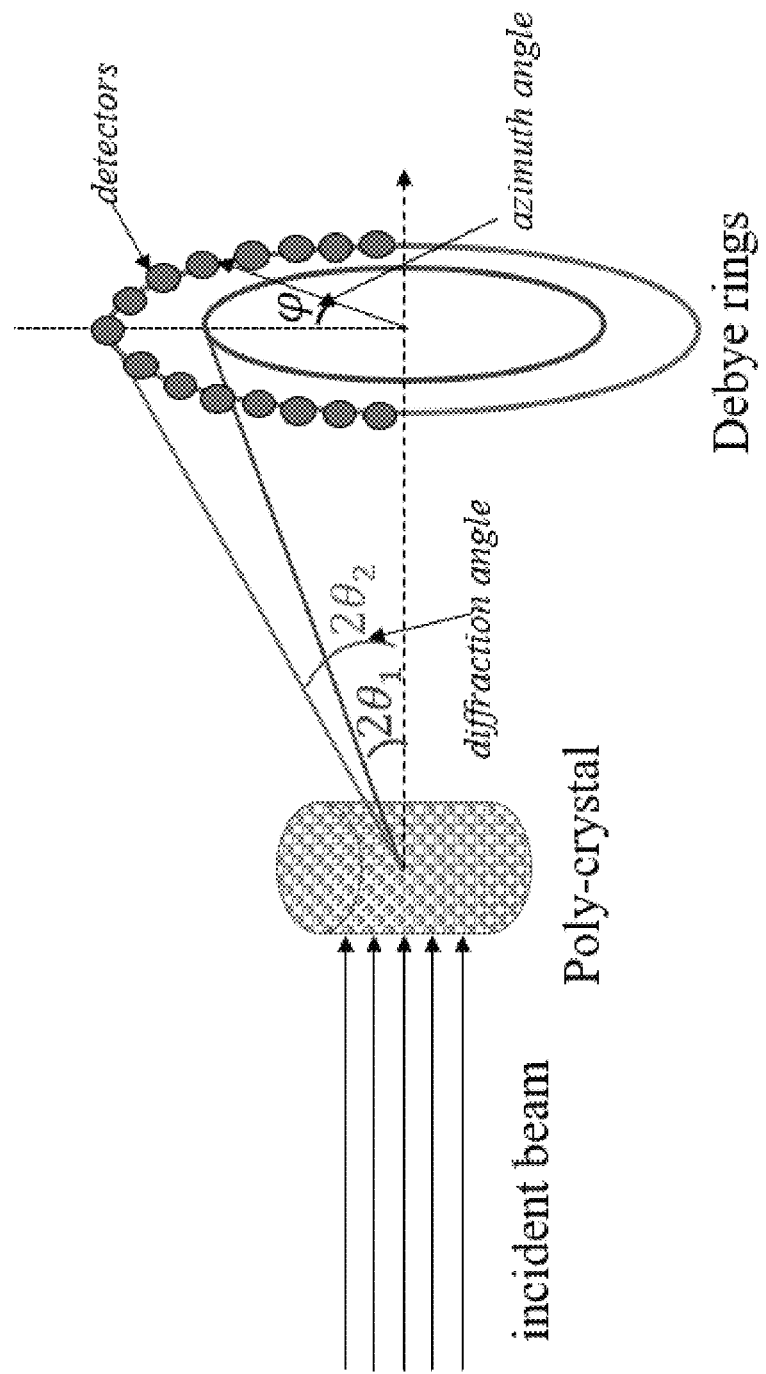
FIG. 1 schematically illustrates the definition of the Debye ring, the diffraction angle and azimuth angle.
Figure 2:
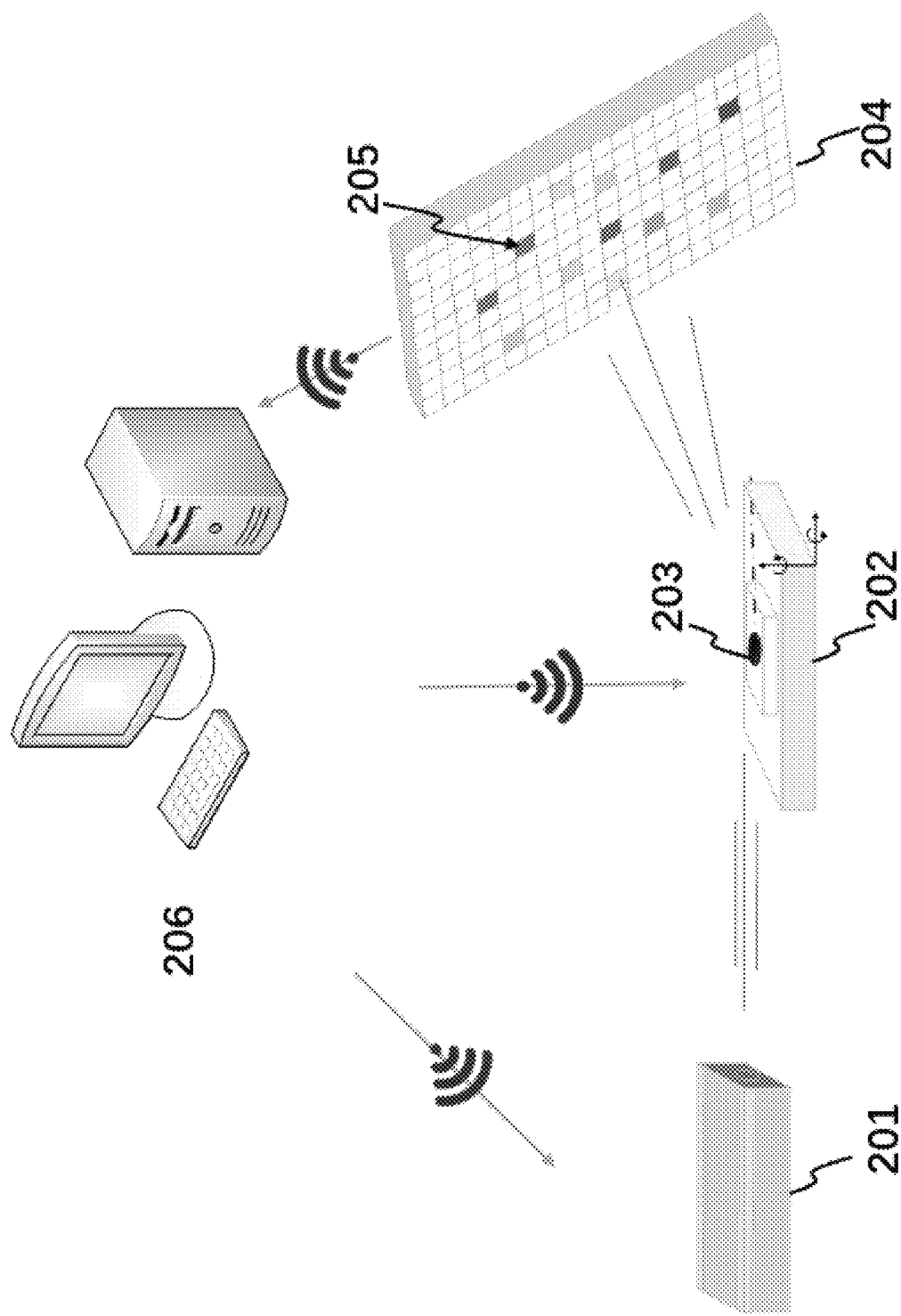
FIG. 2 schematically illustrates a system for two-dimensional energy dispersive X-ray diffraction according to an embodiment of the present invention.
Figure 3:
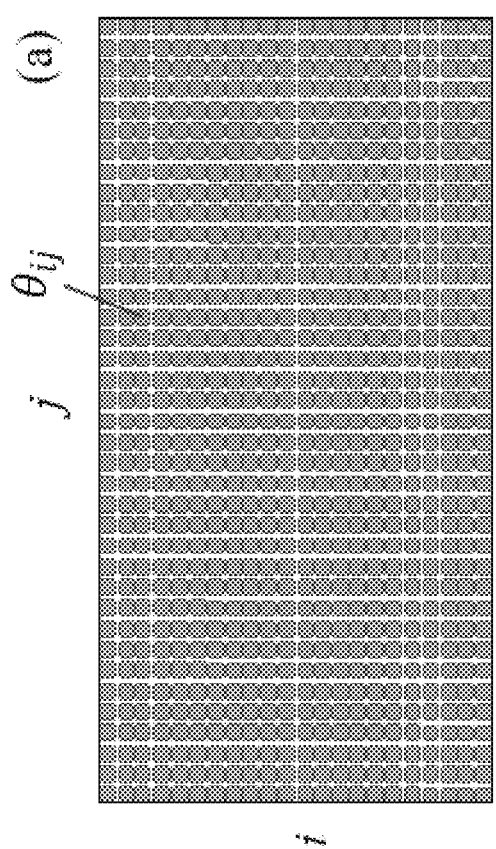
FIG. 3 schematically illustrates a two-dimensional energy dispersive detector with pixels arranged in a rectangular shape.

The details of embodiments of the current invention are as follows:

As shown in FIG. 2, a wide-band or white spectrum X-ray beam emitted from an X-ray source 2014 irradiates a polycrystal sample 203. A sample stage 202 which carries the sample can place the sample at desired locations, for example, at the focal point of the X-ray. The X-ray diffraction signals and X-ray fluorescence signals generated by the sample 203 are collected simultaneously by a two-dimensional energy dispersive detector 204 having an array of pixels 205, each pixel being an independent detector unit that can detect an energy dispersive spectrum. A controller (e.g. a computer) 206 controls the above parts, and can transfer, modify and analyze the collected data. The X-ray source 201 emits a white spectrum X-ray beam. The sample stage 202 is a multi-axis, large working distance and high precision stage. The two-dimensional energy dispersive detector 204 contains many energy dispersive detector pixels 205 as shown in FIG. 3, and each pixel can collect a complete energy dispersive spectrum, i.e., the X-ray intensity as a function of X-ray energy. The two-dimensional energy dispersive detector 204 is usually located in the front diffracting cone, but can also be placed in any position in the diffraction space. Since the diffraction angle of each energy dispersive detector pixel 205 on the two-dimensional detector 204 is different, the diffraction spectrum measured by each pixel can be converted to a lattice spacing spectrum, i.e., the X-ray intensity as a function of the lattice spacing d (rather than energy E), and then all lattice spacing spectrums are added together to calculate an enhanced spectrum. Also, because of the quantum efficiency of detector, air transmission, sample transmission, spectrum of X-ray source, the relative strength distribution of diffraction peaks in EDXRD are different from ADXRD, those elements should be considered to correct the EDXRD spectrum. The fluorescence spectrum is identical at different measure angles, and this property can be used to distinguish the X-ray diffraction signal and X-ray fluorescence signal. Meanwhile, the fluorescence spectrum can be enhanced as well to determine the composition of materials.

In one embodiment, a rectangular two-dimensional energy dispersive detector is shown in FIG. 3, in which the pixels can be uniquely labeled with a row index i and a column index j, and the corresponding diffraction angles is $\theta_{ij}$. The intensity-energy spectrum $\hat{I}(E, \theta_{ij})$ detected by each pixel contains both a diffraction spectrum $I(E, \theta_{ij})$ and a fluorescence spectrum $F(E, \theta_{ij})$. The diffraction spectrums satisfy the Bragg equation $2d\sin\theta_{ij} = n\,12.398/E$, where E is energy in unit of keV and d is lattice spacing in unit of angstrom. The correction function $C(E)$ is a function of photon energy E, including the quantum efficiency of detector, air transmission, sample transmission, spectrum of X-ray source. Each diffraction spectrums will be corrected by the correction function as: $I'(E, \theta_{ij}) = I(E, \theta_{ij})/C(E)$. Then, all corrected diffraction intensity-energy spectrum can be converted into an intensity-lattice spacing spectrum $I'(d, \theta_{ij})$ the Bragg equation with n set to 1. By summing the diffraction intensity-lattice spacing spectrums over all pixels, i.e., $I'(d) = \Sigma_{i,j} I'(d,\theta_{ij})$, an enhanced diffraction intensity-lattice spacing spectrum is obtained. The fluorescence spectrums can also be summed.

Figure 4:
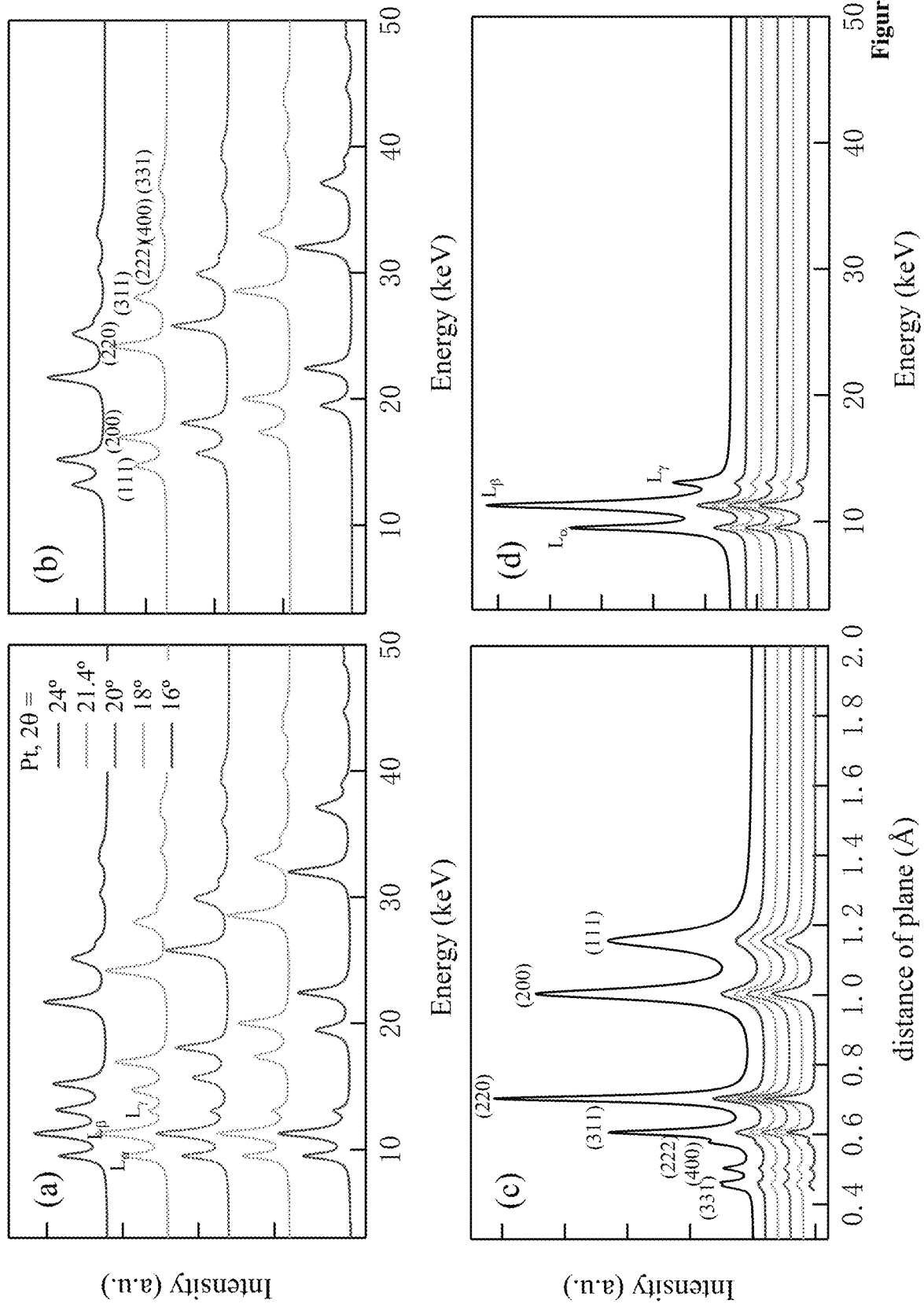
FIG. 4 schematically illustrates data processing of the energy dispersive spectrums at different diffraction angles.

FIG. 4 shows an example of this data processing method with the correction function of $C(E)=1$. In panel (a), the five different curves are five energy-dispersive spectrums of Pt with diffraction angles $2\theta$ at (curves from bottom to top) 16°, 18°, 20°, 21.4° and 24°. The left-most three peaks are $L\alpha$, $L\beta$ and $L\gamma$ of Pt X-ray fluorescence peaks (and their positions do not change with detection angle $\theta$), and the others are X-ray diffraction peaks. Panel (b) shows the pure X-ray diffraction spectrums with the fluorescence signal removed. In panel (b), the peaks are labeled with their Miller indices such as (1,1,1), etc. Then, the abscissa axis of the spectrum curves is converted from energy (E) to lattice spacing (d) using the Bragg equation described above, and the five resulting X-ray diffraction spectrums are shown in panel (c) as the bottom five curves. A total spectrum is obtained by summing the five spectrums of different detection angles and is shown in panel (c) as the topmost curve. As can be appreciated, in this example, the intensity of the total spectrum curve is on the order of five times stronger than any single spectrum curve. Panel (d) shows the original and enhanced fluorescence spectrums (the abscissa axis is not converted to lattice spacing d for the fluorescence spectrum).

In practice, there may be millions of detector pixels in a two-dimensional energy dispersive detector 204. Therefore, summing over all pixels will significantly improve the total diffraction and fluorescence intensity.

A process for detecting X-ray diffraction and X-ray fluorescent spectrums according to embodiments of current invention is described below:

(1) Calculate the diffraction angle $\theta_{ij}$ of each 205 of the two-dimensional detector 204 based on the geometric relationship between the X-ray 201, the sample 203 and the two-dimensional energy dispersive detector 204 as well as the location of that pixel 205 on the detector 204. In a practical embodiment, the system may be calibrated using a known poly-crystal material with known lattice constants as the sample 203; the diffraction angle $\theta_{ij}$ for each pixel of the detector can be calculated from the spectrums $I(E, \theta_{ij})$ measured by that pixel, using the Bragg equation and the known lattice constants of the known poly-crystal sample. This avoids the need to carry out the geometric calculation.

(2) Measure the X-ray signal from a target poly-crystal sample and obtain the X-ray intensity spectrum $\hat{I}(E, \theta_{ij})$ on each pixel 205. These detection spectrums are transmitted to the computer for analyzing.

(3) The spectrums collected by the pixels 205 of the energy dispersive detector 204 contain the fluorescence spectrums, which are identical for all different diffraction angles. Using this property, the fluorescence spectrum $F(E, \theta_{ij})$ is extracted from the X-ray intensity spectrums $\hat{I}(E, \theta_{ij})$ leaving the pure diffraction spectrums $I(E, \theta_{ij})$.

(4) Determine the correction function $C(E)$ according to the quantum efficiency of detector, air transmission, sample transmission, substrate transmission, spectrum of X-ray source, and other related parameters.

(5) Correct each diffraction spectrums by the correction function as: $I'(E, \theta_{ij})=I(E, \theta_{ij})/C(E)$.

(6) Convert pure diffraction spectrums $I'(E, \theta_{ij})$ into lattice spacing spectrums $I'(d, \theta_{ij})$ using the Bragg equation. Sum the lattice spacing spectrums over all pixels (i,j), i.e., calculate $I'(d)=\Sigma_{i,j}I'(d, \theta_{ij})$ to obtain an enhanced diffraction spectrum which can then be used to determine the structure of the target material.

(7) Sum the extracted fluorescence spectrums over all pixels (i,j), i.e., calculate $F(E)=\Sigma_{i,j}F(E, \theta_{ij})$ to obtain an enhanced fluorescence spectrum which can then be used to determine the composition of the target material.

In summary, embodiments of the current invention provide a fast X-ray diffraction and fast X-ray fluorescence spectroscopy technique. The advantages of the embodiments of current invention are as follows:

(1) The embodiments of the present invention break the limitation of requiring the detectors to be placed all on the same Debye ring, improve the poly-crystal diffraction intensity detection by a few orders of magnitude, and reduce the data acquisition time, which realize the rapid determination of the material structure of the sample with a synchrotron radiation or laboratory X-ray source. Meanwhile, it is suitable for dynamics structure analysis and high throughput X-ray diffraction.

(2) The X-ray spectrums detected by embodiments of the current invention include both X-ray diffraction spectrum and X-ray fluorescence spectrum, which can be used to determine the structure and composition of materials simultaneously. The intensity of both spectrums from the embodiments of current invention is improved by a few orders of magnitude compared to existing technologies.

(3) A purpose of embodiments of the current invention is to increase the measured diffraction intensity of poly-crystal samples. Meanwhile, embodiments of the current invention can also be applied for strongly textured samples and single crystal samples to determine their structure, lattice parameters and composition directly. Thus, one diffractometer can determine both the structure and composition of various types of samples including powder, poly-crystal and single crystal samples.

EXAMPLES

First Embodiment

Figure 5:
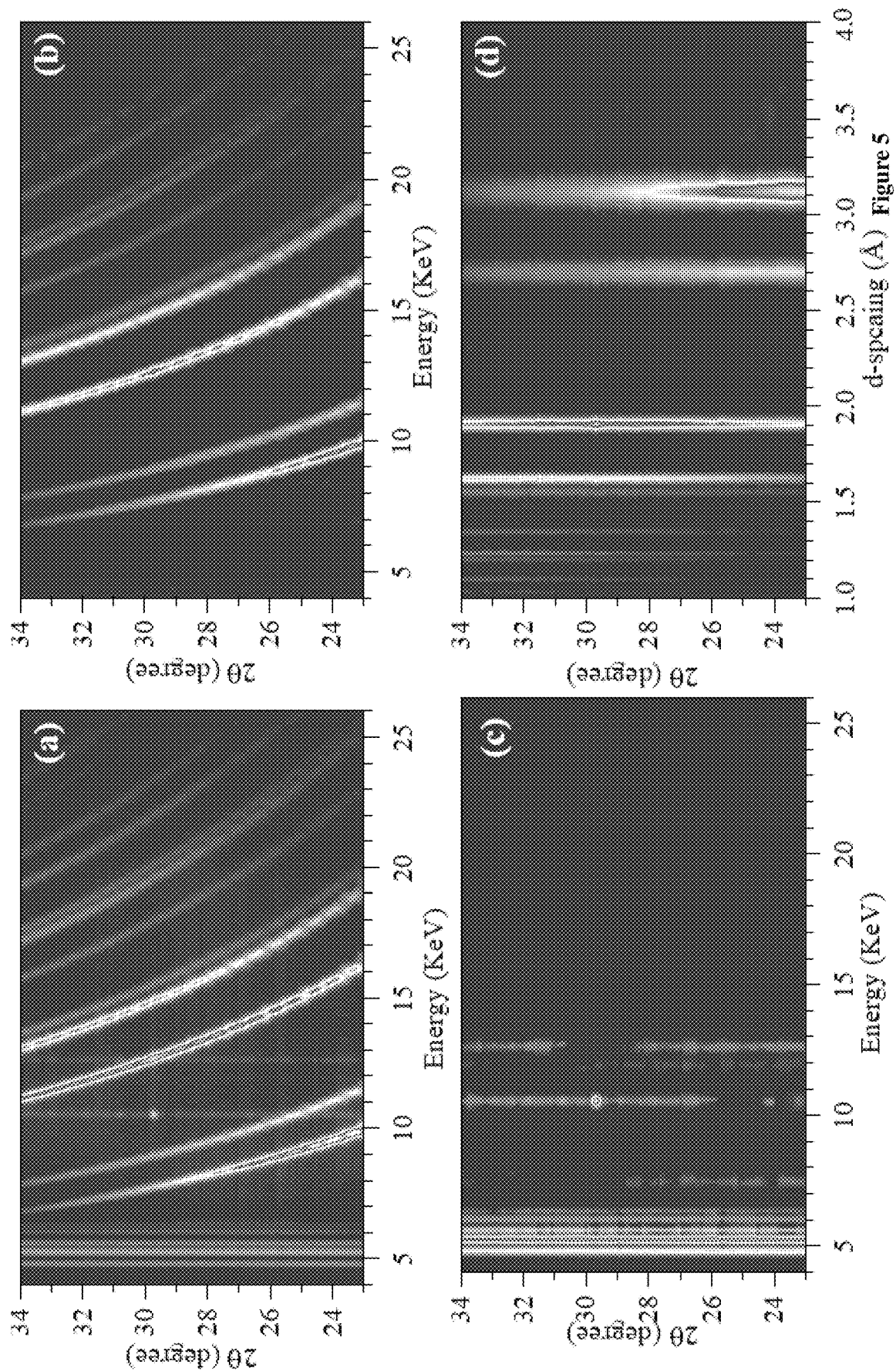
FIG. 5 schematically illustrates the EDXRD data collecting by a two-dimensional energy dispersive detector with 121 pixels on $CeO_2$ sample. (a) the energy dispersive spectrums $\hat{I}(E, \theta_{ij})$ including diffraction and fluorescence signals; (b) the pure diffraction spectrums $I(E, \theta_{ij})$ without correction; (c) the fluorescence spectrum $F(E, \theta_{ij})$; (d) the pure diffraction spectrums $I(d, \theta_{ij})$ in lattice spacing.
Figure 6:
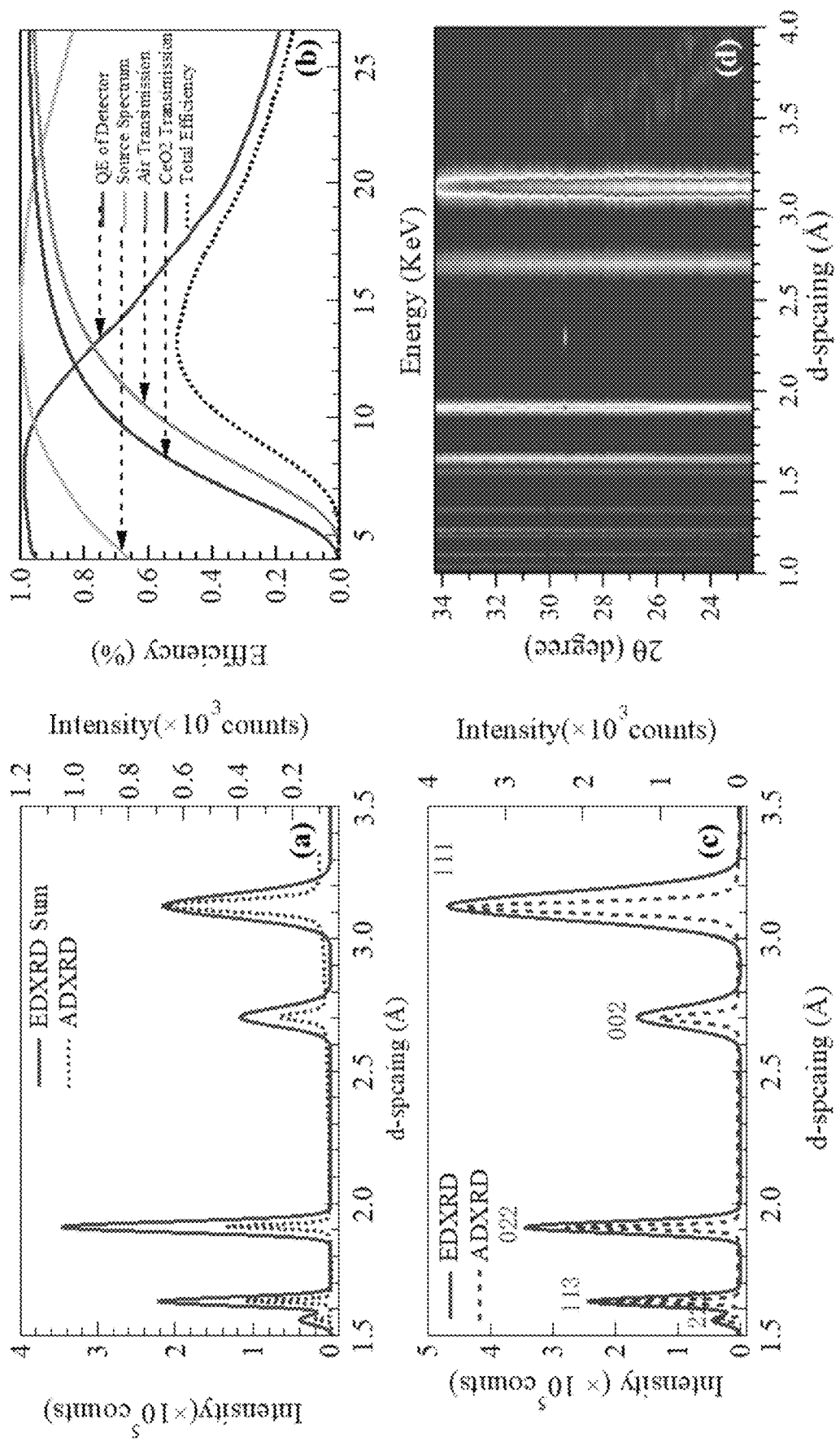
FIG. 6 schematically illustrates the correction method of diffraction spectrum in EDXRD. (a) the diffraction spectrums comparison between ADXRD and EDXRD; (b) the correction function, the quantum efficiency of detector, the X-ray spectrum of bending magnetic, the transmission of air and $CeO_2$ sample; (c) the diffraction spectrums comparison between ADXRD and corrected EDXRD; (d) the corrected diffraction spectrums $I'(d, \theta_{ij})$ in lattice spacing.
Figure 7:
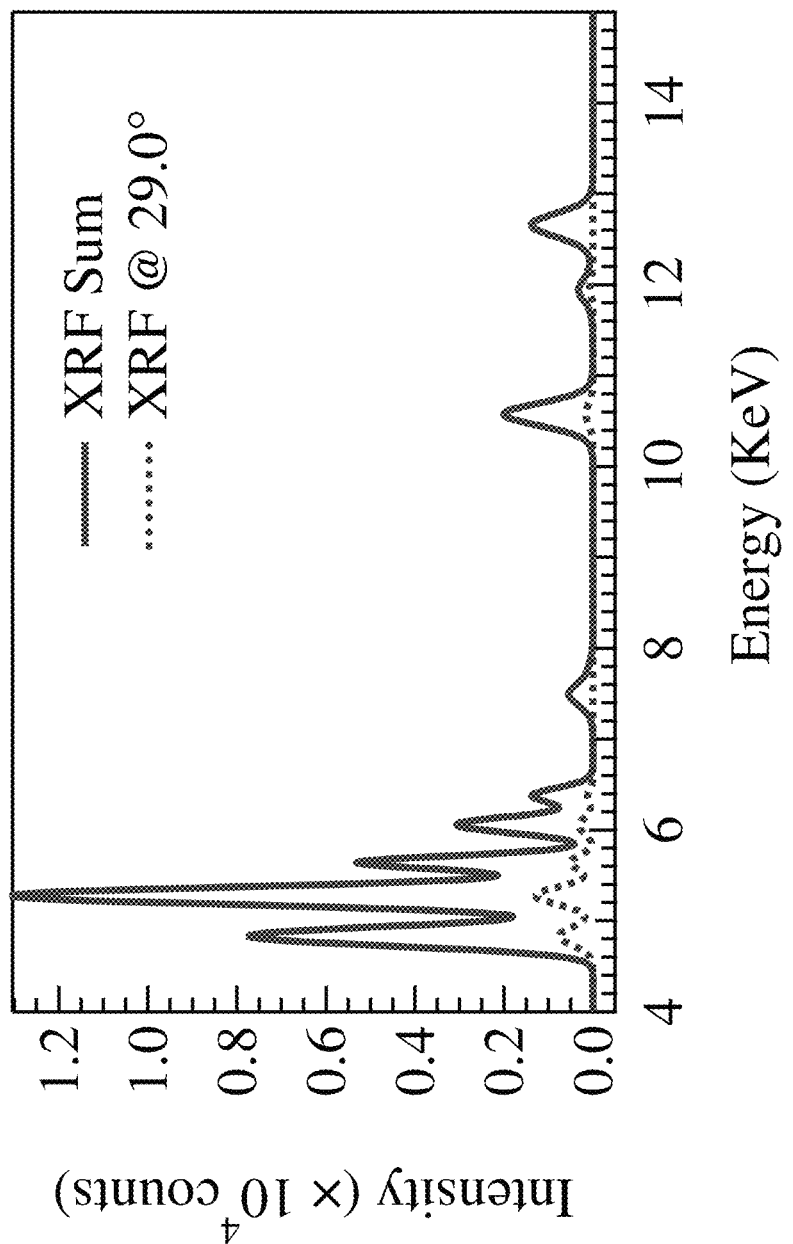
FIG. 7 schematically illustrates the fluorescence spectrums comparison between the data from single pixel and summarized all pixels.

The X-ray source 201 of the current embodiment is a bending magnetic in a synchrotron radiation facility with energy range from 4 keV to 30 keV. The sample stage 202 is a multi-axis stage which can be used to mount powder, poly-crystal $CeO_2$ sample. The detector 204 is a two-dimensional energy dispersive detector combined by 11*11 SDD detectors. Each SDD detector is Amp-TEK X123 with active are 17 $mm^2$. The best energy resolution of this detector is about 125 eV. The center pixel is locating at diffraction angle 29° with the distance from sample 650 mm. So the diffraction angles of pixels are in the range from 23° to 34°. FIGS. 5, 6 and 7 show the experiments results and data processing of this embodiment.

Each pixel of the detector collects one energy dispersive spectrum $\hat{I}(E)$. FIG. 5(a) shows the combined energy dispersive spectrums $\hat{I}\hat{I}(E, \theta_{ij})$ with energy as horizontal axis and diffraction angle as vertical axis. It can be found in FIG. 5(a) that the location of some peaks does not change with diffraction angle and others' change. The former group represent the fluorescence spectrums. And the latter group represent the diffraction spectrums. According to this property, the pure diffraction spectrums $\hat{I}\hat{I}(E, \theta_{ij})$ and the pure fluorescence spectrums $F(E, \theta_{ij})$ are shown in FIG. 5(b) and FIG. 5(c). Then the pure diffraction spectrums $I(d, \theta_{ij})$ in lattice spacing can be converted from FIG. 5(b). Then the location of peaks does not change with diffraction angle in FIG. 5(d). So, both the fluorescence spectrums $F(E, \theta_{ij})$ and the diffraction spectrums $I(d, \theta_{ij})$ can be summed up along the diffraction angle $\theta_{ij}$ to enhance the total intensity and signal-noise level. The summed count of diffraction peaks in EDXRD is about 90 times higher than ADXRD as shown in FIG. 6(a). The summed count of fluorescence peaks is about 100 times higher than single pixel signal as shown in FIG. 7.

But there are two problems of the pure energy dispersive spectrums $I(d, \theta_{ij})$ in FIG. 5(d) and FIG. 6(a). First, the intensity of diffraction peaks changes with diffraction angle in FIG. 5(d), which is not consist with the diffraction theory. Second, the relative intensity distribution of peaks in EDXRD are not consistent with the data in ADXRD. Both problems are causing by the different efficiency at different energy. The efficiency here should contain the quantum efficiency of detector, the air transmission, the sample transmission, the spectrum distribution of light source and other related parameters. The quantum efficiency of detector can be determined from the product manual, which is mainly determined by the material of sensor. The air and sample transmission can be found from material database, such as http://henke.1bl.gov/optical_constants/. The spectrum distribution of light source can be measured by the monochromatic and photodiode on the beamline. The total efficiency is the product of above efficiency factors. FIG. 5(b) shows those efficiency functions. The correction function C(E) used here is the black line in FIG. 5(b). The corrected diffraction spectrum I'(E, $\theta_{ij}$) is obtained by dividing the energy spectrum I(E, $\theta_{ij}$) with the correction function C(E). Then it can be converted into the diffraction spectrums I'(d, $\theta_{ij}$) in lattice spacing as shown in FIGS. 6(c) and 6(d). After correction, the relative intensity distribution of peaks is almost the same as ADXRD, and the intensity of peaks are almost homogenous along the diffraction angle. In order to get better correction, the correction function may be determined by experiment measurement.

The current embodiment of EDXRD covers a solid angle only of 8.1 msr. Meanwhile, the ADXRD covers a solid angle of 3.49 sr. But the intensity of diffraction in EDXRD is already the 90 times higher than in ADXRD. It is easy to assume that the EDXRD with 3.49 sr solid angle will be 39000 times higher than in ADXRD.

Second Embodiment

The X-ray source 201 of the current embodiment is preferably a bending magnetic in a synchrotron radiation facility or a rotating anode laboratory X-ray source to produce white X-ray beam with an energy range from 4 keV to 35 keV. The incident angle of the white X-ray beam with respect to the horizontal plane of the sample stage is preferably from 5° to 10°. The sample stage 202 is a multi-axis stage which can be used to mount powder, poly-crystal and single crystal samples. In one example, the detector 204 is a two-dimensional energy dispersive detector (such as a pnCCD detector or SDD arrays from PNDetector, Germany) covering an area of 300×300 mm² with a pixel size 75×75 um² and an energy resolution around 150 eV. By setting the open angle of pixel $\Delta\theta \approx 0.06°$, the distance D between the detector and the sample and the pixel size l satisfy the relationship D=l/$\Delta\theta \approx 10^3 \cdot l$ which means that a two-dimensional energy dispersive detector with a pixel size 75 um should be located at distance D=75 mm. Setting the diffraction angle of a center pixel of the detector 204 as $2\theta_c=65°$, the two-dimensional energy dispersive detector 204 can cover a diffraction angle range from 1.5° to 128.5°, meaning around 1.1π solid angle. Using this setup, the resolution of the lattice planes distance d of the current embodiment is around $\Delta d/d \approx 1\%$ with diffraction angle 65° and X-ray energy 15 keV.

For X-ray diffraction with a single energy dispersive detector (e.g. AMP-TEK 25 mm2 SDD detector) to achieve the open angle of pixel of 0.06°, the detector should be locate at a distance 2.8 m from the sample, or locate at 75 mm with an extra 75 um slit to reduce the open angle. Obviously, the latter option covers a larger solid angle of about $4 \times 10^{-5}$. So with the same X-ray sources, the detected total X-ray intensity in the embodiments of current inventions may be as high as $1.1\pi/(4 \times 10^{-5}) \approx 90,000$ times of the intensity measured by a single energy dispersive detector.

The technique of arc energy dispersive X-ray diffraction is the one where multiple energy dispersive detectors are placed at the same diffraction angle. The measured intensity ratio between the embodiment of the current embodiment and the arc energy dispersive X-ray diffraction technique is approximately $$\frac{I_{2E}(hkl)}{I_E(hkl)} \approx \frac{\Delta\Theta}{\Delta\theta} \quad (1)$$

where $\Delta\Theta$ is the range of diffraction angle covered by the two-dimensional energy dispersive detector, and $\Delta\theta$ is the range of diffraction angle covered by a point detector. This means, with the same photon flux density and lattice resolution, the diffraction intensity of the embodiment of current invention will be about 127/0.06=2117 times the arc energy dispersive X-ray diffraction used by M. Drakopoulos. Thus, the current embodiment increases the diffraction intensity of energy dispersive diffraction techniques dramatically.

Two-dimensional energy dispersive X-ray diffraction utilizes much more X-ray photons than normal X-ray diffraction with area detector. With the same photon flux density, the same geometric setup and around 1% resolution of the lattice planes distance, the intensity of two-dimensional energy dispersive X-ray diffraction according to the present embodiments is about 1/1%=100 times of normal X-ray diffraction with an area detector. When using the bending magnetic in synchrotron radiation as the white spectrum X-ray source, the transmission efficiency of white spectrum X-ray is about 30 times higher than that of the monochromatic X-ray (The transmission efficiency of the monochromatic X-ray is much lower with a crystal monochromator). This means that, with the bending magnetic X-ray source, the diffraction intensity of the two-dimensional energy dispersive detector is about 3000 times than the single wavelength diffraction method with normal area detector. Thus, the apparatus of this embodiment using a bending magnetic X-ray source increases the diffraction intensity dramatically, which is reaching the diffraction intensity of currently used with synchrotron undulator X-ray source and normal area detector.

It will be apparent to those skilled in the art that various modification and variations can be made in the X-ray diffraction and X-ray spectroscopy method and apparatus of the present invention without departing from the spirit or scope of the invention. Thus, it is intended that the present invention cover modifications and variations that come within the scope of the appended claims and their equivalents.

We claim:

1. A system for rapidly measuring and analyzing structure and composition of a material sample, comprising:
    an X-ray source configured to emit a white X-ray beam;
    a sample stage for holding a sample and placing the sample on an irradiation path of the X-ray source;
    a two-dimensional energy dispersive detector disposed in a predetermined spatial relationship with the sample stage to receive X-ray signals from the sample, the two-dimensional energy dispersive detector including an array of energy dispersive pixels, each pixel being an independent detector unit configured to detect an energy dispersive X-ray spectrum; and
    a controller connected to the X-ray source, the sample stage, and the two-dimensional energy dispersive detector, to control them and to perform data analysis;

wherein the controller includes a computer usable non-transitory medium having a computer readable program code embedded therein for controlling the controller, the computer readable program code configured to cause the controller to execute a process for analyzing data detected by the two-dimensional energy dispersive detector, the process comprising:
separating X-ray diffraction signals and X-ray spectroscopy signals in the energy dispersive X-ray spectrum detected by each pixel;
correcting the detected X-ray diffraction signals by a correction function which includes at least a quantum efficiency of the detector, a transmission of air and the sample, an X-ray spectrum of the light source;
summing the corrected X-ray diffraction signals and X-ray spectroscopy signals, respectively, over all pixels of the two-dimensional energy dispersive detector, to obtain an enhanced diffraction spectrum and an enhanced spectroscopy spectrum;
using the enhanced diffraction spectrum to determine the structure of the sample; and
using the enhanced spectroscopy spectrum to determine the composition of the sample.

2. The system of claim 1, wherein the two-dimensional energy dispersive detector is located in a front diffracting cone of the sample.

3. The system of claim 1, wherein the analyzing step further comprises calculating a diffraction angle $\Theta_{ij}$ of each pixel, wherein i and j are indices of the pixel in the array of pixels.

4. The system of claim 3, wherein the step of calculating a diffraction angle $\Theta_j$ of each pixel is performed using geometric relationships between the X-ray source, the sample and the two-dimensional energy dispersive detector.

5. The system of claim 3, wherein the step of calculating a diffraction angle $\Theta_j$ of each pixel is performed by measuring, using each pixel, an intensity-energy diffraction spectrum of a known poly-crystalline sample placed on the sample stage, the white X-ray beam, and the two-dimensional energy dispersive detector, wherein the known poly-crystalline sample has known lattice constants, and calculating the diffraction angle $\Theta_j$ of each pixel using diffraction peak positions in the corresponding measured intensity-energy diffraction spectrum of the known poly-crystalline sample and the known lattice constants.

6. The system of claim 3, wherein the separating step comprises:
obtaining a detected X-ray spectrum $\hat{I}(E,\theta_{ij})$ of each pixel from the data detected by the two-dimensional energy dispersive detector;
from the X-ray spectrums of all pixels, calculating a spectrum component that is common to all pixels as a spectroscopy spectrum $F(E,\theta_{ij})$; and
subtracting the spectroscopy spectrum $F(E,\theta_{ij})$ from the X-ray spectrum $\hat{I}(E,\theta_{ij})$ of each pixel to calculate a diffraction spectrum $I(E,\theta_{ij})$ for each pixel.

7. The system of claim 6, wherein the summing step comprises:
summing the spectroscopy spectrum $F(E,\theta_{ij})$ over all pixels to obtain the enhanced spectroscopy spectrum $F(E)=\Sigma_{ij} F(E,\theta_{ij})$;
correcting each diffraction spectrum by a correction function as $I'(E,\theta_{ij})=I(E,\theta_{ij})/C(E)$, where $C(E)$ is the correction function which includes at least a quantum efficiency of the detector, a transmission of air and the sample, an X-ray spectrum of the light source;
using Bragg equation $2\ d\sin\theta_{ij}=n\cdot 12.398/E$, converting the diffraction spectrums $I'(E,\theta_{ij})$ for each pixel into an intensity-lattice spacing spectrum $I'(d,\theta_{ij})$ for each pixel; and
summing the lattice spacing spectrum $I'(d,\theta_{ij})$ over all pixels to obtain the enhanced diffraction spectrum $I'(d)=\Sigma_{i,j} I'(d,\theta_{ij})$.

8. The system of claim 1, wherein the structure of the sample includes a crystal structure, a crystal orientation, and positions of crystalline in poly-crystal.

9. The system of claim 1, wherein the sample stage is a multi-axis stage configured to have a scanning mode.

10. A method for rapidly measuring and analyzing structure and composition of a poly-crystalline sample, comprising:
holding the poly-crystalline sample on a sample stage;
illuminating the poly-crystalline sample with a white X-ray beam generated by an X-ray source;
detecting X-ray diffraction and X-ray spectroscopy signals from the sample using a two-dimensional energy dispersive detector, the two-dimensional energy dispersive detector containing an array of energy dispersive pixels, each pixel being an independent detector unit configured to detect an energy dispersive X-ray spectrum; and
analyzing data detected by the two-dimensional energy dispersive detector using a computer, including:
separating X-ray diffraction signals and X-ray spectroscopy signals in the energy dispersive X-ray spectrum detected by each pixel;
correcting the detected X-ray diffraction signals by a correction function which includes at least a quantum efficiency of the detector, a transmission of air and the sample, an X-ray spectrum of the light source;
summing the corrected X-ray diffraction signals and X-ray spectroscopy signals, respectively, over all pixels of the two-dimensional energy dispersive detector, to obtain an enhanced diffraction spectrum and an enhanced spectroscopy spectrum;
using the enhanced diffraction spectrum to determine the structure of the sample; and
using the enhanced spectroscopy spectrum to determine the composition of the sample.

11. The method of claim 10, wherein the analyzing step further comprises calculating a diffraction angle $\theta_{ij}$ of each pixel, wherein i and j are indices of the pixel in the array of pixels.

12. The method of claim 11, wherein the step of calculating a diffraction angle $\theta_{ij}$ of each pixel is performed by using geometric relationships between the X-ray source, the sample and the two-dimensional energy dispersive detector.

13. The method of claim 11, wherein the step of calculating a diffraction angle $\theta_{ij}$ of each pixel is performed by measuring, using each pixel, an intensity-energy diffraction spectrum of a known poly-crystalline sample placed on the sample stage, the white X-ray beam, and the two-dimensional energy dispersive detector, wherein the known poly-crystalline sample has known lattice constants, and calculating the diffraction angle $\theta_{ij}$ of each pixel using diffraction peak positions in the corresponding measured intensity-energy diffraction spectrum of the known poly-crystalline sample and the known lattice constants.

14. The method of claim 11, wherein the separating step comprises:

obtaining a detected X-ray spectrum $\hat{I}(E,\theta_{ij})$ of each pixel from the data detected by the two-dimensional energy dispersive detector;

from the X-ray spectrums of all pixels, calculating a spectrum component that is common to all pixels as a spectroscopy spectrum $F(E,\theta_{ij})$; and subtracting the spectroscopy spectrum $F(E,\theta_{ij})$ from the X-ray spectrum $\hat{I}(E,\theta_{ij})$ of each pixel to calculate a diffraction spectrum $I(E,\theta_{ij})$ for each pixel.

15. The method of claim 14, wherein the summing step comprises:

summing the spectroscopy spectrum $F(E,\theta_{ij})$ over all pixels to obtain the enhanced spectroscopy spectrum $F(E)=\Sigma_{ij} F(E,\theta_{ij})$;

correcting each diffraction spectrum by a correction function as $\hat{I}(E,\theta_{ij})=I(E,\theta_{ij})/C(E)$, where $C(E)$ is the correction function which includes at least a quantum efficiency of the detector, a transmission of air and the sample, an X-ray spectrum of the light source;

using Bragg equation $2 d\sin\theta_{ij}=n\ 12.398/E$, converting the diffraction spectrums $\hat{I}(E,\theta_{ij})$ for each pixel into an intensity-lattice spacing spectrum $\hat{I}(d,\theta_{ij})$ for each pixel; and summing the an intensity-lattice spacing spectrum $\hat{I}(d,\theta_{ij})$ over all pixels to obtain the enhanced diffraction spectrum $\hat{I}(d)=\Sigma_{ij} \hat{I}(d,\theta_{ij})$.

16. The method of claim 10, wherein the material sample is a powder sample, a poly-crystalline sample or a single crystalline sample.

17. The method of claim 10, wherein the X-ray spectroscopies includes X-ray fluorescence spectroscopy, and X-ray absorption spectroscopy.

18. The method of claim 10, wherein the structure of the sample includes a crystal structure, a crystal orientation, and positions of crystalline in poly-crystal.

19. The method of claim 10, wherein the sample stage is a multi-axis stage configured to have a scanning mode.

* * * * *